United States Patent [19]

Smith

[11] 4,337,455
[45] Jun. 29, 1982

[54] APPARATUS FOR PROCESSING VIDEO SIGNALS RECEIVED FROM AN OPTICAL SCANNER

[75] Inventor: William R. Smith, Mountain View, Calif.

[73] Assignee: Caere Corporation, Los Gatos, Calif.

[21] Appl. No.: 222,268

[22] Filed: Jan. 2, 1981

Related U.S. Application Data

[60] Continuation of Ser. No. 45,103, Jun. 4, 1979, abandoned, which is a division of Ser. No. 898,822, Apr. 21, 1978, Pat. No. 4,180,799.

[51] Int. Cl.³ ............................................... G06K 9/38
[52] U.S. Cl. ........................................... 340/146.3 AG
[58] Field of Search ............. 340/146.3 AG; 307/358, 307/356, 351, 353, 221 D; 328/151, 146–149; 358/282, 280

[56] References Cited

U.S. PATENT DOCUMENTS

| | | | |
|---|---|---|---|
| 3,159,815 | 12/1964 | Groce | 340/146.3 AG |
| 3,267,293 | 8/1966 | Hinds | 340/146.3 AG |
| 3,484,747 | 12/1969 | Nunley | 340/146.3 MA |
| 3,534,334 | 10/1970 | Bartz et al. | 340/146.3 AG |
| 3,599,148 | 8/1971 | Stern | 340/146.3 AG |
| 3,675,201 | 7/1972 | McKissick et al. | 340/146.3 AG |
| 3,701,099 | 10/1972 | Hall et al. | 340/146.3 AG |
| 3,820,068 | 6/1974 | McMillin | 340/146.3 AG |
| 3,833,883 | 9/1974 | Haupt et al. | 340/146.3 AG |
| 3,909,594 | 9/1975 | Allais et al. | 340/146.3 AG |
| 4,132,977 | 1/1979 | Nagano | 340/146.3 AG |
| 4,234,895 | 11/1980 | Sommer et al. | 358/280 |
| 4,247,873 | 1/1981 | Decuyper | 340/146.3 AG |

Primary Examiner—Leo H. Boudreau
Attorney, Agent, or Firm—Blakely, Sokoloff, Taylor & Zafman

[57] ABSTRACT

An apparatus for processing video signals received from an optical scanner is described. A comparator means is used for comparing the video signals with a dynamic threshold voltage. This threshold voltage is generated by a peak detector circuit which also receives the video signals. The peak detector circuit includes decay means for decaying signals representative of the detected peaks at a predetermined rate. This thresholding technique provides compensation for a wide dynamic range of video signals received from a photodiode array.

1 Claim, 5 Drawing Figures

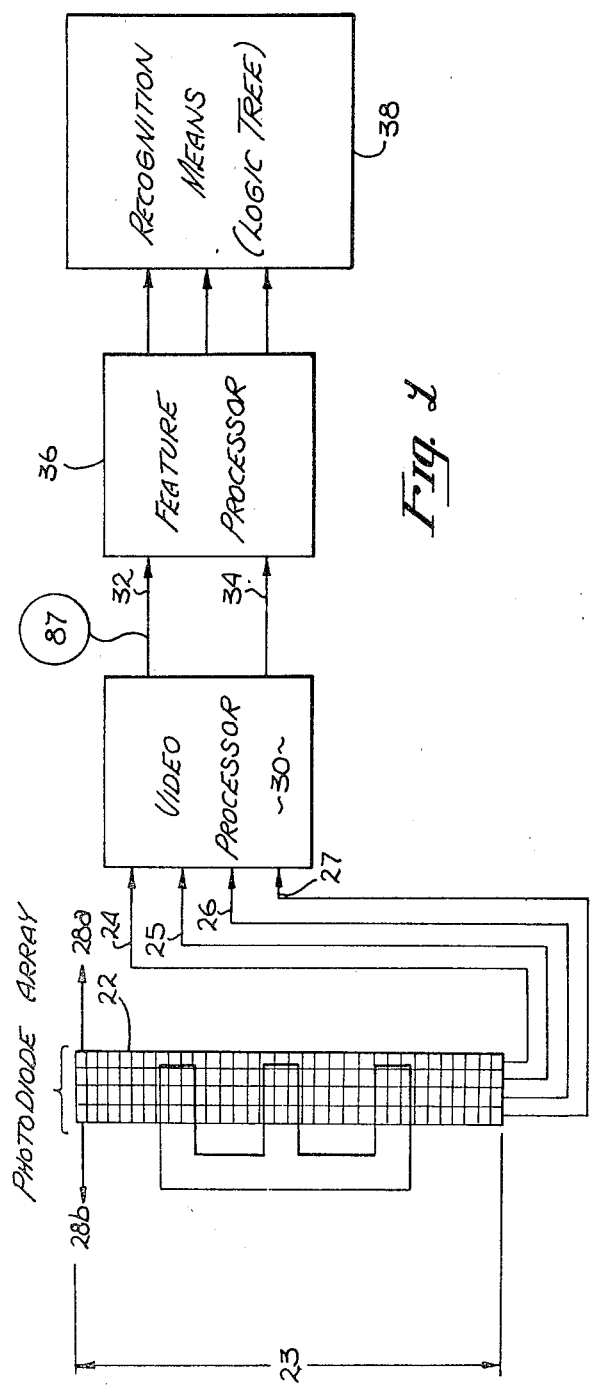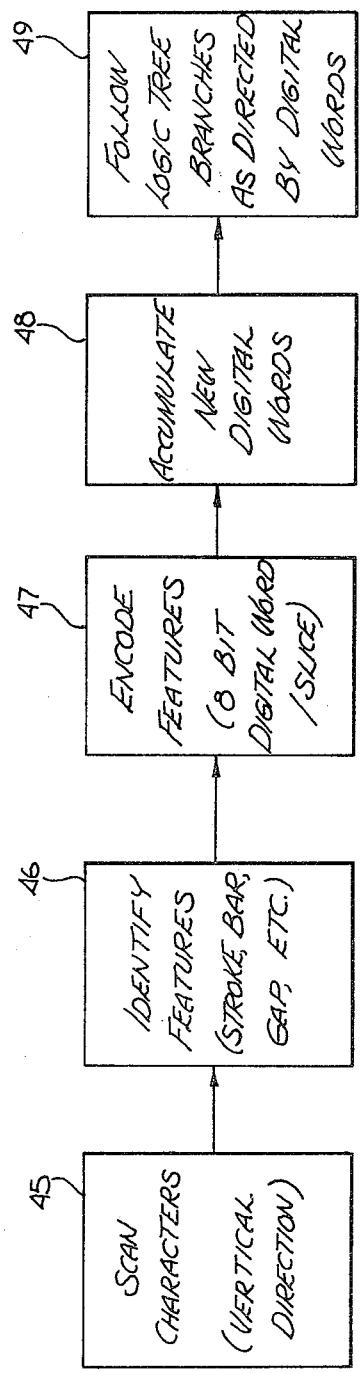

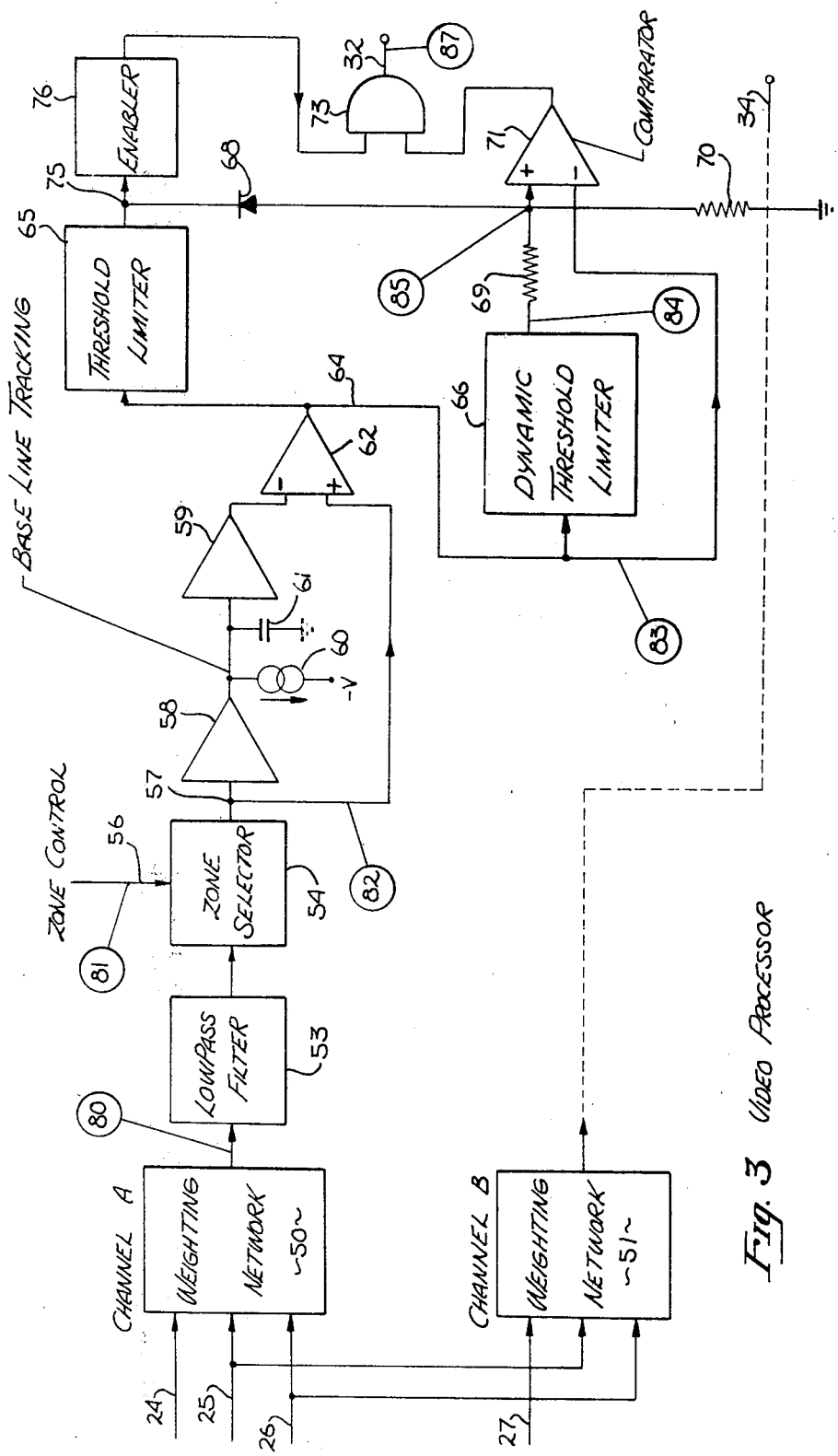
Fig. 3 VIDEO PROCESSOR

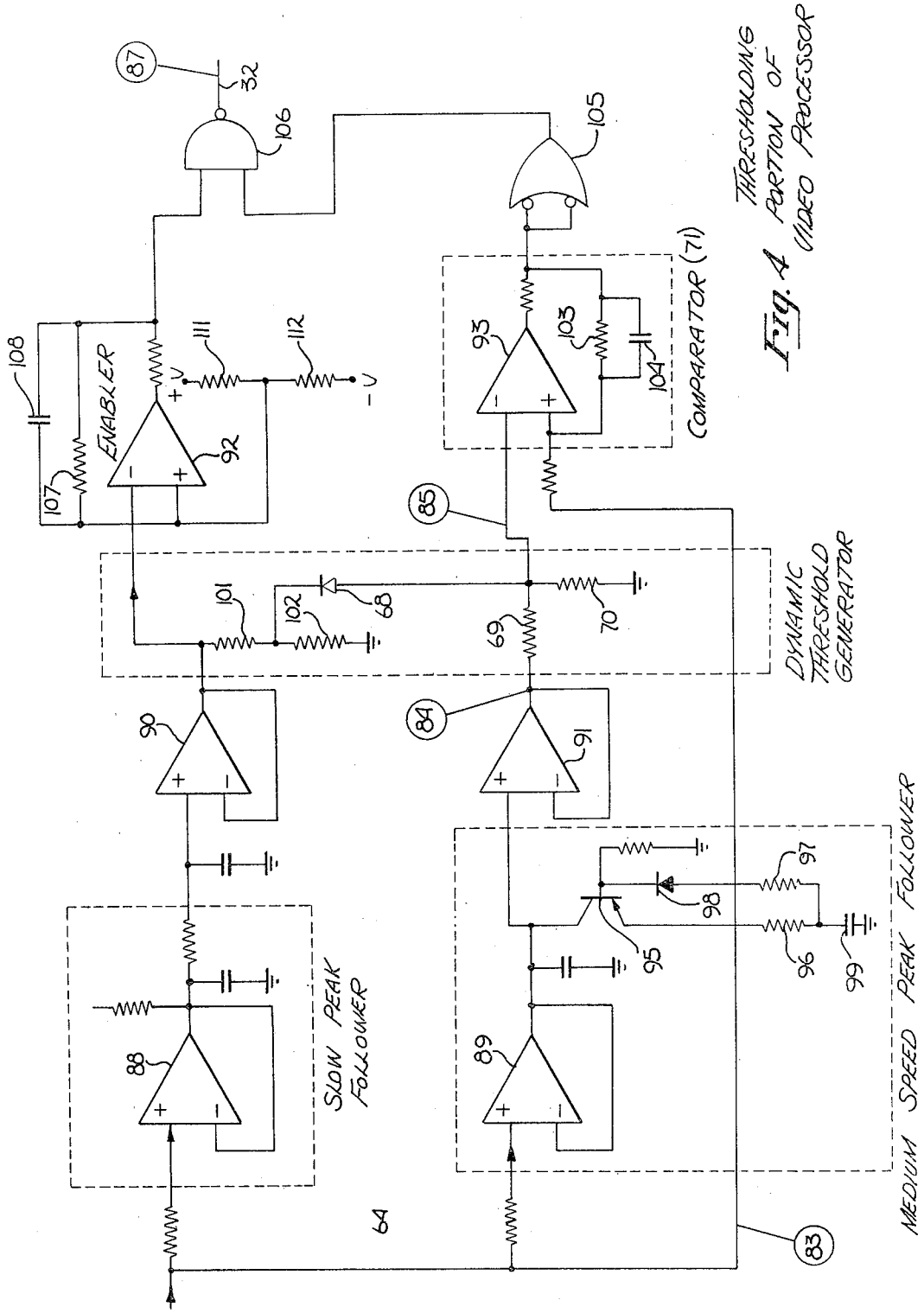

APPARATUS FOR PROCESSING VIDEO SIGNALS RECEIVED FROM AN OPTICAL SCANNER

This is a continuation of application Ser. No. 45,103, now abandoned, filed June 4, 1979 which prior application is a divisional of application Ser. No. 898,822 filed Apr. 21, 1978, now U.S. Pat. No. 4,180,799.

BACKGROUND OF THE INVENTION

1. Field of the Invention

The invention relates to the field of character recognition systems, U.S. Class 340/146.3.

2. Prior Art

There is a continuing demand for character recognition systems, particularly those which are able to discern ordinary printed alpha-numeric symbols. The most common approach to character recognition compares, in a two-dimensional array, the viewed characters with predetermined forms. Often this comparison proceeds by examining predetermined areas of the viewed character to determine if they are dark or light. This two-dimensional, sectional analysis is shown graphically in U.S. Pat. No. 3,964,022, FIGS. 9a–9f. This particular system employs a 32×32 self-scanned, photodiode array. The video data is digitized and then stored in an appropriate memory. One problem with this type of system is that in addition to requiring large memory storage, it attempts to handle all the information for a particular character at one time. That is, the entire two-dimensional array is considered at one time. This results in poor utilization of circuitry.

In U.S. Pat. No. 3,873,972 another character recognition system is disclosed. In this case, a linear array is employed for scanning the characters as shown in FIG. 2. However, the video information from this array is accumulated in the scratch-pad memory 42. Then both horizontal and vertical features are detected and used to identify characters. Thus, even though this system employs a linear array, it is again a two-dimensional matrix approach which also stores unprocessed video.

As will be described, with the invented apparatus and method the raw video data is not stored, but rather is analyzed as it is read from the linear array. The recognition of characters is done more in a "pipeline" manner which permits better utilization of the circuitry when compared to prior art approaches.

SUMMARY OF THE INVENTION

An optical reader for recognizing printed characters employing a hand-held wand, in the presently preferred embodiment, is described. The wand includes a four-diode-wide linear array which electrically scans the characters in vertical slices as the wand is moved across a field of characters. The video signals from these four channels are weighted to provide two channels of video data. Depending upon the horizontal direction of movement of the wanding across the characters, one of these channels is selected as the primary channel. The raw video data is first processed in a video processor which includes a dynamic thresholding means. This thresholding means provides compensation for the wide dynamic range of video signals received from the photodiode array. A feature analyzer is then employed to analyze the video signals in the primary channel for a plurality of predetermined features such as strokes, bars, large bars and gaps. A comparison of the video data in both the channels is made to determine the direction of character development (upper or lower). A digital word is encoded with the detected features for each scan. A state machine is next used to compare each word with the preceeding word to detect new words; each new word is stored in a first-in, first-out register. A logic tree-type analysis is conducted in a digital computer on each word from this register to determine the possible characters possessing the extracted features. As each word from the register is compared with words from the program memory, the possible number of characters having those features is narrowed until a single character is identified.

The apparatus also employs a zone control means for selecting a portion of the video information from each slice for processing. This zone control means compensates for the fact that in hand-wanding, the characters may not be in the center of the vertical field-of-view of the photodiode array. As the wand is moved from character to character, the zone control means determines where in the field-of-view the character is to appear, and then prevents the processing of data outside this zone.

BRIEF DESCRIPTION OF THE DRAWINGS

FIG. 1 is a general block diagram of the inverted apparatus.

FIG. 2 is a flow chart illustrating the invented method for recognizing characters, which method is implemented by the apparatus of FIG. 1.

FIG. 3 is a block diagram of the video processor of FIG. 1.

FIG. 4 is an electrical schematic of a portion of the video processor of FIG. 3.

DETAILED DESCRIPTION OF THE INVENTION

Figure 5:
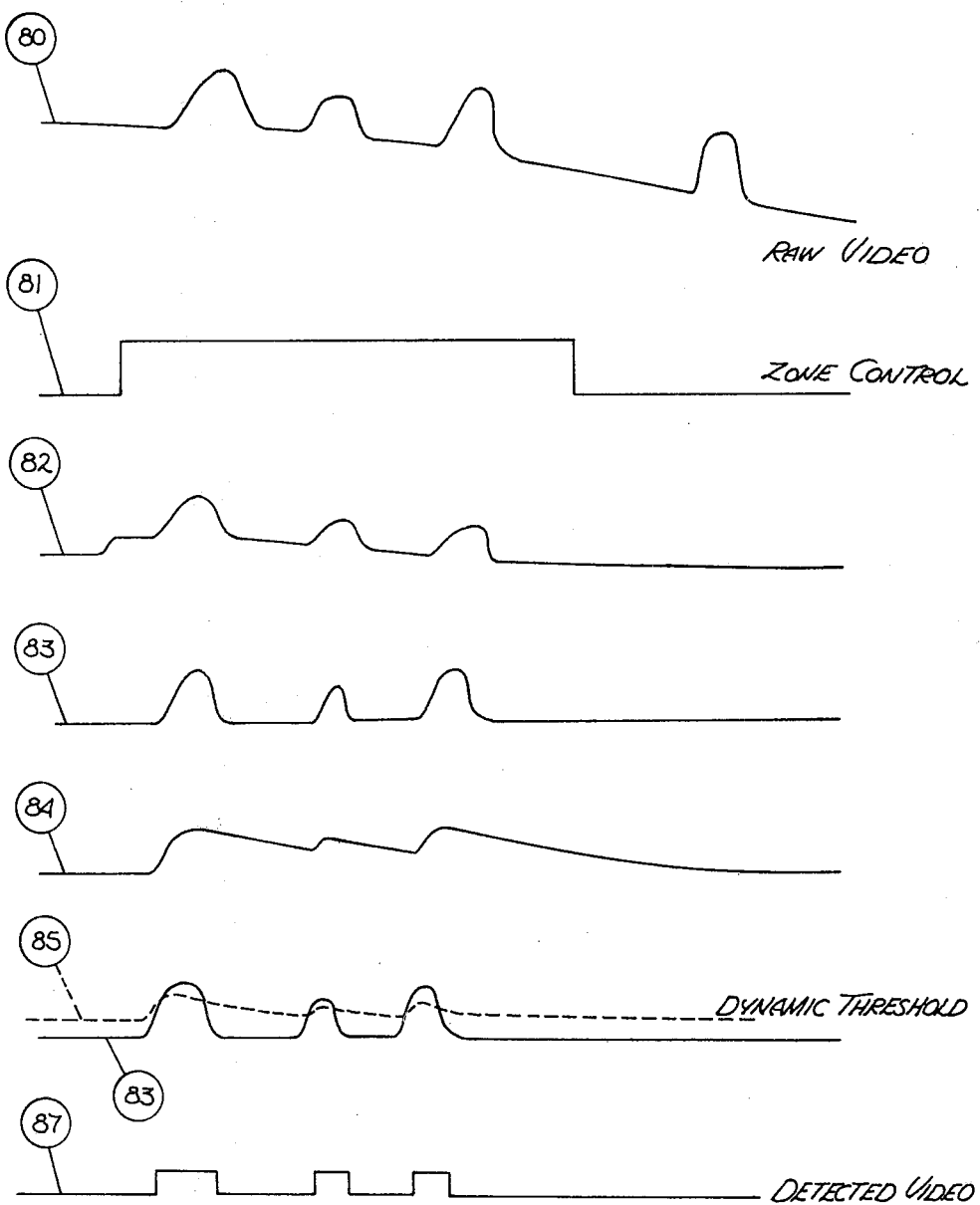
FIG. 5 is a graph of waveforms associated with the video processor of FIGS. 3 and 4.

A video processing apparatus is described for use with a scanner system which recognizes characters such as alpha-numeric characters. Other details of the complete scanner system using the described apparatus are contained in U.S. Pat. No. 4,180,799.

In the following descriptions, numerous specific details are provided, such as specific numbers of divides, bits, etc., in order that the invented apparatus and method be thoroughly understood. It will be obvious to one skilled in the art, however, that the invented apparatus and method may be practiced without employing these specific details. In other instances, well-known components, techniques, etc., are not set forth in detail in order not to obscure the invention in unnecessary detail.

In the presently preferred embodiment, the characters such as alpha-numeric characters are scanned by a photodiode array which is contained within a hand-held wand. The wand is moved horizontally across a field of characters (in either direction) while the photodiode array is scanned to provide video signals representative of the viewed characters. In the presently preferred apparatus, the wand includes a light aligning means to assist the operator in aligning the wand with the field of characters. This light aligning means is described in copending application, Ser. No. 918,894, filed June 26, 1978 now U.S. Pat. No. 4,240,748 which is assigned to the assignee of this application. The invented apparatus and method may be employed with other than hand-held optical reading means, particularly those which provide relative motion between a photodiode array and the printed characters.

The wand includes incandescent bulbs which illuminate the characters. The reflected light from the characters is focused through a lens system onto the photodiode array. The photodiode array is electrically scanned to provide serial video signals. As best illustrated in FIG. 1, the photodiode array 22 is generally aligned vertically with respect to the characters such as character 20 (letter E). The movement of the wand provides relative motion in either the directions 28a or 28b. Automatic line tracking electrically locates the characters within the vertical field of view of the linear photodiode array 22. This field of view is shown by the dimension 23 of FIG. 1.

In the presently preferred embodiment, the photodiode array 22 consists of a 65×4 photodiode array which is commercially available from Reticon Corporation, Sunnyvale, California. This array is continuously scanned at a rate of approximately four microseconds per diode. Each scan or slice consists of 65 data cycles plus 2 dead time cycles giving a full cycle time of 268 microseconds per slice. The output of each of the sections of the array shown as lines 24, 25, 26 and 27 are coupled through amplifiers (not illustrated) to a video processor 30.

While in the presently preferred embodiment a four-diode-wide array is used, it will be apparent from the following disclosure that a one-dimensional array may be employed where the direction of movement is known. The use of the four-diode-wide array is primarily to improve the recognition reliability by compensating for typical printing imperfections. Also, while an electrically scanned photodiode array is used, other light sensing means may be employed. For example, light sensitive regions coupled to a charge-coupled device (CCD) provide an equivalent video signal by "reading" all the regions at the same time and then serially shifting out the sensed readings. In general, the video processor 30 first weighs the video signals on lines 24, 25, 26 and 27 to provide two channels of video data as will be described in conjunction with FIG. 3. Thresholding means including a dynamic thresholding means (described in detail in conjunction with FIG. 4) are then employed to provide a light/dark indication from the video signals.

The two channels of video data from the processor 30 are coupled to a feature processor 36 by lines 32 and 34. Predetermined features of a character are identified from the video data. These features are: stroke, bar, large bar, gap, large external gap and an upper/lower feature indicator. For each scan or slice of a character taken by the photodiode array, an 8-bit digital word is encoded with the detected features.

The digital words are employed in a logic tree means to recognize the characters. As each new word is received from the processor 36, the recognition means 38 compares the features with known features. The matching of the detected features with the stored features directs the flow in a logic tree so as to lead to the recognition of a single character.

In FIG. 2 the invented method is shown in general form. Block 45 illustrates that the characters are first scanned in the vertical direction. Each slice of each character is then examined to identify predetermined features such as stroke, bar, gap, etc., as shown by block 46. For each slice of a character, the identified features are encoded into an 8-bit digital word (feature word). This is shown by block 47. Each word is then compared with the previous word to identify new words. These new words are accumulated as shown by block 48. Note that in a typical application, as the wand is manually moved over the characters, a number of consecutive, identical feature words results.

The feature words are employed to direct a course in a logic tree as shown by block 49.

Referring now to FIG. 3 and the block diagram of the video processor 30 of FIG. 1, the four lines of video signals from the photodiode array are coupled to weighting networks 50 and 51. Specifically, lines 24, 25 and 26 are connected to network 50 and lines 25, 26 and 27 are connected to network 51. The output of the network 50 provides one channel of video data designated as Channel A. A typical waveform of the raw video at the output of network 50 is shown in FIG. 5 as waveform 80. (References to the waveforms of FIG. 5 are shown in circles in FIGS. 3 and 4.) Within each of the networks 50 and 51, three lines of video signals are combined in an ordinary manner to provide a single channel of video. The weighting within these networks is done to provide smoothing and averaging of the signals received from the photodiode array.

The output of the network 51, designated as Channel B, is processed in a similar manner as the output of network 50 and results in an output signal from the processor 30 on line 34. For sake of clarity, only the blocks associated with Channel A are shown. In typical printed characters, numerous defects in terms of the consistency and density of the ink occur. Ink "voids" are detected as white areas by the photodiode array. By weighting the signals from three channels, compensation is provided for these defects. Similarly, excessive ink which appears on intended white areas causes unwanted detections. The weighting networks also compensate for these "spots."

The output of the weighting network 50 is coupled through a lowpass filter 53. The lowpass filter, which may be an ordinary filter, is employed to remove part of the DC component from the raw video signal.

The output of the lowpass filter 53 is coupled to a zone selector 54. The zone selector is used to couple a section of the video signal from each vertical scan or slice to line 57. The zone selector 54 receives a control signal on line 56; a typical waveform for this control signal is shown as waveform 81 of FIG. 5. A typical waveform at the output of selector 54 (line 52) is shown as waveform 82 of FIG. 5. An ordinary switching means may be employed for the zone selector 54.

The use of a multi-element photodiode array has the disadvantage of nonuniform sensitivity from element-to-element, and also from line-to-line. Moreover, such devices are often temperature sensitive, and thus drift. The DC level of the video signal tends to drift also because of the nonuniformity of the whiteness of the paper and the changes in the lighting levels from the incandescent bulbs used to illuminate the characters. The base line tracking circuit which includes amplifiers 58, 59 and 62, constant current source 60 and capacitor 61 substantially reduces the effects of these variations and also enhances the signalt-to-noise ratio.

Line 57 is coupled through amplifier 58 to the constant current source 60, capacitor 61, and the input terminal of amplifier 59. The output of amplifier 59 is coupled to one input terminal of the amplifier 62. Line 57 is also coupled directly to the other input terminal of amplifier 62.

The amplifier 58 tracks the DC level on line 57. This amplifier has a relatively slow time constant, and thus does not track the data from the photodiodes contained on the DC level. Capacitor 61 is charged to the DC level tracked by the amplifier 58. The capacitor 61 is slowly discharged by the constant current source 60. The current source 60 enables the capacitor to track a negative signal by slowly discharging the capacitor at a constant rate. In this manner the capacitor may follow either a positive or negative signal. The charge on the capacitor 61 is buffered by the buffer amplifier 59. The DC level at the output of the buffer amplifier 59 is subtracted from the video signal on line 57 within the differencing amplifier 62 to provide the video signal less its DC component on line 64. The waveform of the signal at the output of the differencing amplifier 62 is shown as waveform 83 of FIG. 5.

The remainder of the circuitry of FIG. 3 is used to discern the difference between light or dark, that is, whether the photodiode is observing printing or the background paper. The signal on line 64 is applied to a threshold limiter 65 which establishes a general threshold level at node 75. The dynamic threshold limiter 66 is a faster reacting limiter, as will be described in greater detail in conjunction with FIG. 4, and provides a dynamic threshold level across the resistors 69 and 70. The common junction between these resistors is coupled to an input terminal of amplifier 71. Node 75 is also coupled to this terminal via the diode 68. The other input terminal to the amplifier 71 receives the signal on line 64. The output from the amplifier 71 is coupled to one input terminal of the AND gate 73. The other input terminal of the AND gate 73 is coupled to the output of an enabler 76.

In general, the thresholding circuit operates by comparing the dynamic threshold provided by limiter 66 with the signal on line 64. The limiter 65 provides a clamping voltage to the amplifier 71 to prevent the dynamic threshold from dropping below a predetermined level. The enabler 76 prevents output signals through the gate 73 when there is weak video; this prevents detection of noise.

Referring now to FIG. 4, the presently preferred embodiment of the thresholding means is shown in detail. Line 64 is again shown along with the output line 32. The dynamic threshold limiter 66 of FIG. 3 is realized as a medium speed peak follower. The signal on line 64 is coupled to one input terminal of a voltage comparator 89. The other input terminal of this comparator is coupled to its output, one input terminal of an operational amplifier 91, and to the collector terminal of transistor 95. The emitter terminal of transistor 95 is coupled to ground through a resistor 96 and a capacitor 99. The common junction between this resistor and capacitor is coupled to the base terminal of transistor 95 through a diode 98 and a resistor 97. This transistor terminal is also coupled to ground through a resistor. The output of the operational amplifier 91 is coupled to one of its input terminals and also to the voltage divider comprising resistors 69 and 70 which are also shown in FIG. 3.

The threshold limiter 65 of FIG. 3 is realized as a slow peak follower and includes a voltage comparator 88, one input terminal of which is coupled through a resistor to lines 64. The output terminal of the comparator 88 is coupled to the other input terminal of this comparator and to one input terminal of an operational amplifier 90 through an RC network. The output terminal of the amplifier 90 is coupled to the other of its input terminals, one input terminal of voltage comparator 92 and to a voltage divider network comprising resistor 101 and 102. The common junction between these two resistors is coupled through the diode 68 to the common junction between resistors 69 and 70.

The enabler 76 of FIG. 3 is fabricated from a comparator 92. The output terminal of the comparator is coupled to one input terminal of an NAND gate 106. The output of the amplifier is also fed back to its input terminal through the parallel combination of capacitor 108 and resistor 107. This input terminal is also biased through resistor 111 and 112.

The comparison function performed by the amplifier 71 of FIG. 3, in the presently preferred embodiment, is performed by voltage comparator 93 which has one of its input terminals coupled to receive the divided output from amplifier 91. The other input terminal to this comparator receives the signal from line 64; this input terminal is also coupled to the output of the amplifier through a feedback path consisting of the parallel combination of resistor 103 and capacitor 104. The output of the amplifier 93 is coupled to the other input terminal of the gate 106 through gate 105; gate 105 is connected to operate as an inverter.

In the presently preferred embodiment, the amplifiers 90 and 91 are commercially available operational amplifiers, in particular, Part No. TL 082 available from Texas Instruments. The voltage comparators 88, 92 and 93 are commercially available comparators, Part No. LM 339. The comparator 89 again is a commercially available part, Part No. LM 319. The resistors 69 and 70 have the value 4.32K and 10K, respectively.

The medium speed peak follower follows the peaks of the video signal as is best shown in FIG. 5 by the waveform 84. As may be seen, the follower is fairly responsive to the peaks of the waveform 83; however, after each peak, the output of the amplifier 91 begins to decay. The waveforms 83 and 84 are compared in comparator 93. The waveform 84 is shown as the dotted waveform 85 in FIG. 5, superimposed on the waveform 83 to show the manner in which the light/dark contrasts are detected. Note that the peaks of the video signal for the illustrated example exceed the dynamic threshold sufficiently to cause an output signal to occur. The output signal at gate 106 is shown as waveform 87 and is identified as the detected video signal.

The slow peak follower more slowly follows the peak levels of the video signal and provides a signal through the diode 68 to clamp the dynamic threshold to a minimum level to prevent the detection of noise when larger time intervals occur between peaks. When no signal is present, the enabler 76 through gate 106 prevents any signal from appearing on line 32, thus essentially turning off the channel to prevent the detection of random noise spikes which might otherwise be detected.

It should be mentioned that substantial variations typically occur in the black densities and background white densities. Because of these, the video signal can vary over a considerable dynamic range. The dynamic thresholding means above described compensates for this and permits the reliable detection of the dark/light areas.

I claim:

1. In an apparatus for recognizing characters, such as alpha-numeric characters, an improved video processor for processing video signals corresponding to slices of said characters received from an optical scanner having a plurality of parallel linear arrays comprising:

comparator means for comparing said video signals with a dynamic threshold voltage, said comparator means coupled to receive said video signals;

threshold generation means coupled to said comparator means for generating said dynamic threshold voltage for said comparator means, said threshold generation means coupled to receive said video signals and including circuit means responsive to the peaks of said video signals so as to set said threshold voltage in response to said peaks, said peaks corresponding to portions of said characters within said vertical slices, said circuit means causing said threshold voltage to decay at a predetermined rate after each of said peaks such that said dynamic threshold voltage is a function of the magnitudes of said peak;

clamping means coupled to said comparator means for providing a lower limit for said threshold voltage, said clamping means coupled to and controlled by a first peak follower circuit which follows said peaks of said video signals, whereby an output signal from said processor is prevented when video signals received from said scanner are below a predetermined level; and a weighting network which weights signals from said arrays in a predetermined manner to provide smoothing and averaging of the signals received from the plurality of linear arrays;

whereby compensation for dynamic range variations of said video signals is provided at the output of said comparator means since said signals are compared with said dynamic threshold voltage.

* * * * *